May 6, 1958  A. E. HOLM  2,833,141
APPARATUS AND SYSTEM FOR LEAK TESTING
Filed May 10, 1957  4 Sheets-Sheet 1

INVENTOR.
ALBERT E. HOLM
BY
ATTORNEY

May 6, 1958 A. E. HOLM 2,833,141
APPARATUS AND SYSTEM FOR LEAK TESTING
Filed May 10, 1957 4 Sheets-Sheet 2

INVENTOR.
ALBERT E. HOLM
BY
ATTORNEY

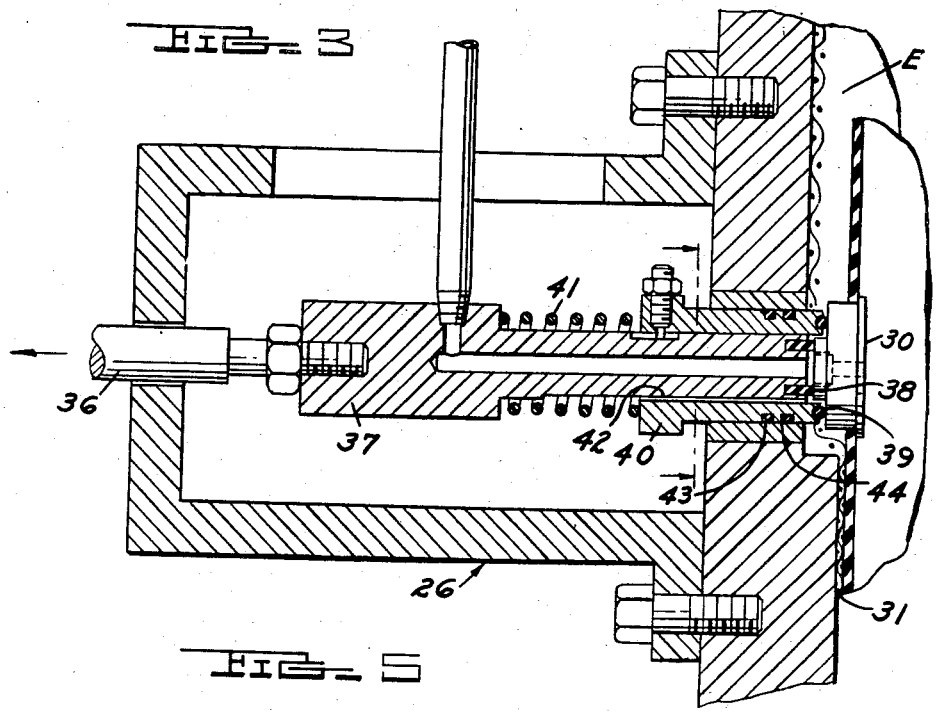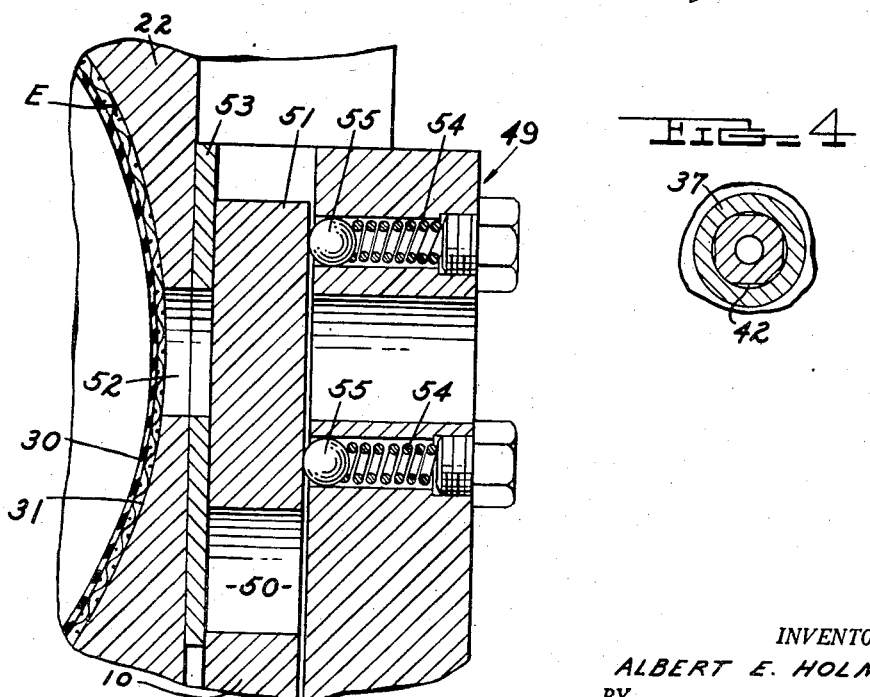

May 6, 1958  A. E. HOLM  2,833,141
APPARATUS AND SYSTEM FOR LEAK TESTING
Filed May 10, 1957  4 Sheets-Sheet 4
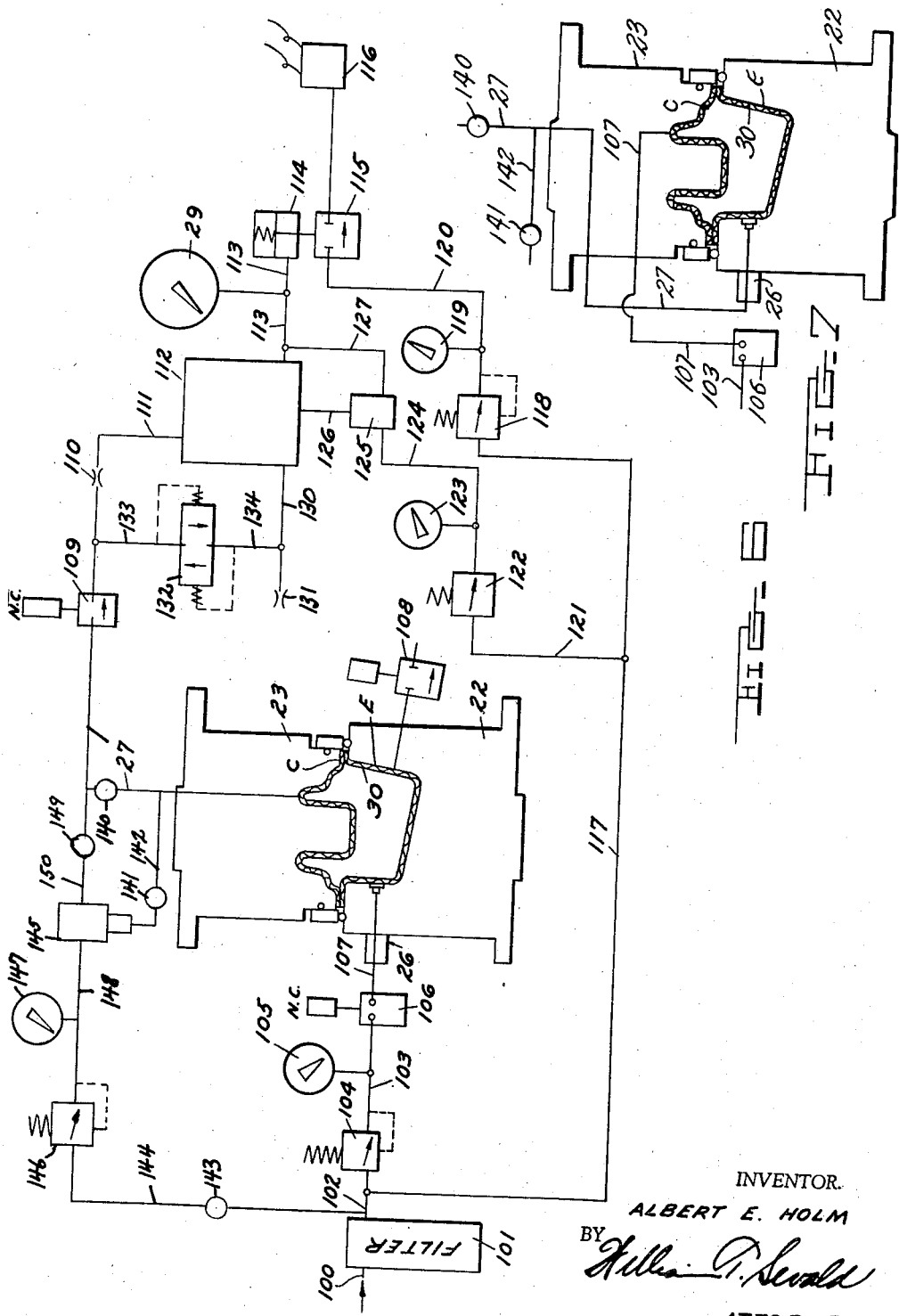
INVENTOR.
ALBERT E. HOLM
BY
ATTORNEY

United States Patent Office 2,833,141
Patented May 6, 1958

2,833,141

APPARATUS AND SYSTEM FOR LEAK TESTING

Albert E. Holm, Rochester, Mich., assignor to Beach Engineering, Inc., Berkley, Mich., a corporation of Michigan Application May 10, 1957, Serial No. 658,403

17 Claims. (Cl. 73—40)

This invention relates to a machine or device for testing parts for leaks which employ a sealed cavity for enclosing the test part in an envelope of air between the cavity walls and the test part wherein the test part or envelope is pressurized and any leak in the part is communicated to the other air envelope or test part. The air envelope is preferably of the smallest possible volume and preferably normally at atmospheric pressure, and the rise in the low pressure side is measured rather than a drop in the high pressure side.

In one form of the invention the test part is internally pressurized at the high test pressure while sealed in a case member having a closely surrounding cavity so that an envelope of air lies between the cavity interior and the part exterior and any leak in the test part is added to the air envelope. Since the air envelope is of very small volume and at very low pressure, even a small volume leak in the test part quickly adds to the air envelope and quickly raises the pressure of the envelope so that the leak is quickly and easily detected as the pressure of the envelope is easily detected as the pressure of the envelope is easily raised, as delicate sensitive instruments can be used at the envelope normally low pressures, and as the leak-ratio is most favorable in testing the envelope as any rise in pressure in the envelope shows the part has a hole. A most favorable advantage exists in the invention as a rise in pressure on the low side of one pound is a relatively large change easily measured by sensitive instruments whereas the drop of one pound in the high side test pressure at 100 lbs. is only a 1% drop not easily detectable thus giving the inventive method a big advantage at only 100 lbs. At 1000 lbs. test pressure, the invention has a 1000 to 1 advantage thereby permitting parts to be tested quickly and accurately at very high pressures which were not heretofore feasible as a drop of 1 lb. at 1000 p. s. i. is only 1 over 1000 or .001 or one-tenth of one percent which is not detectable by heavy instruments operated at 1000 p. s. i. and instrumentation to measure the 1 lb. drop at 1000 p. s. i. are commercially impossible and incomparable to sensitive instruments operating at low pressures.

Conversely, the envelope obviously can be pressurized and the interior pressure of the part measured for a rise in pressure above a low normal such as atmospheric pressure with equal facility.

The invention is to be sharply differentiated from any drop-in-pressure system even employing an envelope such as where the part is placed in a cavity and the cavity raised to a high pressure and then the drop in cavity pressure is measured as an indication of a leak in the part as the ratio is still the old drop in pressure over the test pressure with high pressure unsensitive equipment. Moreover, in this type of test a part with a large leak will fill as fast as the cavity or envelope fills to the test pressure so that upon the test, no drop occurs indicating a leak and the test shows the part good, whereas the part is extremely bad. One company tried and abandoned this method.

Another prior art manner of testing a part for leaks heretofore has been applying a test pressure to the part interior and then gaging any drop in pressure. This has proven unsatisfactory due to the fact that some parts balloon and fatigue under the pressure and in expanding they permit a drop in pressure after the supply has been removed which indicates a leak when actually the drop in pressure is not due to leaking but rather to the expansion of the interior volume capacity of the part. Also, this type of testing has been found difficult to gage due to the fact that if the interior of the part is being tested at a high pressure p. s. i. and a drop in pressure of 1 lb. is at the old ratio since the sensing devices and indicators must be read with the drop in air pressure against them at the high test pressure with a small percentage of drop. With this unfavorable ratio it is hard to detect small leaks due to the fact that the instruments must be of a heavy duty type which are not sensitive to determine a small drop at high pressures.

In the invention, the surrounding envelope or part interior is at atmospheric pressure and the gage and sensing devices are also at atmospheric pressure; therefore, any rise in pressure is easily determined and the instruments can be extremely sensitive and the rise or difference in pressure will be tested against atmospheric reference pressures as one or unity so that the rise or difference in pressure is 100% available for indicating the leak without any ratio being involved, and this has been found to be highly advantageous to determine the permeability of parts very quickly as a rise in pressure is easily determined when there is no unfavorable ratios or disadvantages to work against such as a relatively small drop in a high test pressure.

With the foregoing in view, an object of the instant invention is to provide a testing device or machine for testing which is easily adapted to testing production parts at a high rate of speed wherein millions of parts must be tested in a year's time such as air springs for automobiles wherein four such air springs are used per car and over a million cars are produced by any one company alone.

An object of the invention is to provide a testing apparatus wherein line pressure is constantly applied to the one part or envelope while the other is being tested so that changes in pressure due to temperature changes are not measured or indicated as leaks and also wherein ballooning or contraction of the part is not indicated as a leak. In this connection, constant test pressure is applied throughout the test so that there is no drop in test pressure for any reason such as due to the expanding air absorbing heat so that the part may be chilled and contracted, and slightly later on, involved in an increase of temperature due to the force of pressure applied and the friction of the air under high pressure as well as the stress and strain on the material providing a heating increment raising the temperature of the test pressure air. The constant application of constant test pressure under a regulator system maintains the fluid pressure within the part at a constant level thereby obviating changes due to temperature drops and rises and the part expanding or contracting.

An object of the invention is to provide an apparatus for leak testing where accuracy is not dependent on the high test pressure controller since the system is based on low pressure measurement.

An object of the invention is to provide an apparatus that detects minute leaks that heretofore have not been detectable in pressure drop systems.

An object of the invention is to provide a test cavity formed by two mould-like mating chamber forming members which are sealably engageable to form a sealed air chamber and which are separable to permit the insertion and extraction of test parts.

An object of the invention is to provide a system and apparatus wherein the leak in the part being tested will cause a proportionately greater pressure change in the envelope than the change the leak causes in leaving the part at the test pressure.

An object of the invention is to provide a spring pressed sealing collar around one member which is adapted to contact the other member under sealing pressure wherein the members are capable of slight movement under pressure such as due to part size variations without the seal being broken due to the fact that the sealing collar is spring pressed and urged into sealing engagement with the other member while the one member moves to accommodate the variations of part size or displacement.

An object of the invention is to provide a seal between the chamber member having the sealing collar disposed thereon and the sealing collar so that a seal is maintained during movement of the member relative to the sealing collar.

An object of the invention is to provide a double seal surrounding a relief channel or channels in the means or nozzle for applying the high test pressure to the part being tested wherein the primary seal is made between the test pressure nozzle and the part being tested under the force of a hydraulic ram and wherein the secondary seal surrounds the primary seal on a spring pressed sleeve; the vent channels being provided between the seals from a point adjacent the part being tested so that any leakage between the primary seal will not be permitted to enter the chamber envelope are or low pressure side being tested for a rise in pressure but will be prevented from entering therein by the scondary seal and also relieved by the channels lying between the seals to atmosphere thereby obviating any rise in the low pressure side due to leakage.

An object of the invention is to provide a sliding gate-type valve having sealing lapped surfaces for evacuating or equalizing the envelope area of the test chamber or cavity after the part has been placed therein and the members brought together under pressure due to the fact that the trapping of air is occasioned in closing a chamber having a test part; it is essential that the envelope of air surrounding the test part in the chamber or the low pressure side be equalized such as at atmospheric pressure so that the test can be run at the same pressure each time, namely, preferably atmospheric pressure to which the gages and sensing mechanisms are adjusted for reference.

An object of the invention is to provide screen channels, knurling, or a fissured interior surface in the chamber forming members so that in the event a test part lies against the interior surface of the chamber no sealing-off can ensue and so complete air travel in the chamber is permitted even past an area where the test part is contacting the chamber wall.

An object of the invention is to provide a screen liner for the test chamber especially in the area of the test vent so that no part surface can actually contact the chamber wall or the test vent to cause a seal to be effected and so that complete air travel and channelling is possible at all times due to the fact that the screen prevents the test part from contacting the chamber wall or test vent under sealing conditions.

An object of the invention is to provide a testing apparatus, device, and system which is simple in design and construction, inexpensive to manufacture, easy to use, easy to maintain, and certain and sensitive in operation.

An object of the invention is to provide a testing method, apparatus, device, and system that only requires a sealed chamber to receive the test part, means for applying the test pressure to the part or chamber, and a gage, even a tire gage, for measuring the pressure of the low pressure side.

An object of the invention is to provide a novel apparatus so integrated that commercial program timers, transmitters, valves, relays, switches, etc. can be used obviating the necessity of making special equipment.

These and other objects of the invention will become apparent by reference to the following description of a low-pressure high-speed testing device and method of testing embodying the invention taken in connection with the accompanying drawings, in which:

Fig. 3 is a cross-sectional view of Fig. 1 taken on the line 3—3 thereof showing the test-pressure nozzle integration.

Fig. 4 is a cross-sectional view of Fig. 3 taken on line 4—4 thereof showing the test pressure leak bleed channels.

Fig. 5 is a cross-sectional view of Fig. 1 taken on the line 5—5 thereof showing the low-side pressure equalizing valve construction.

Fig. 6 is a diagrammatic showing of a leak testing system embodying the invention with the test part interior pressurized; and Fig. 7 is a showing similar to Fig. 6 illustrating the envelope pressurized outside the test part.

Figure 1:
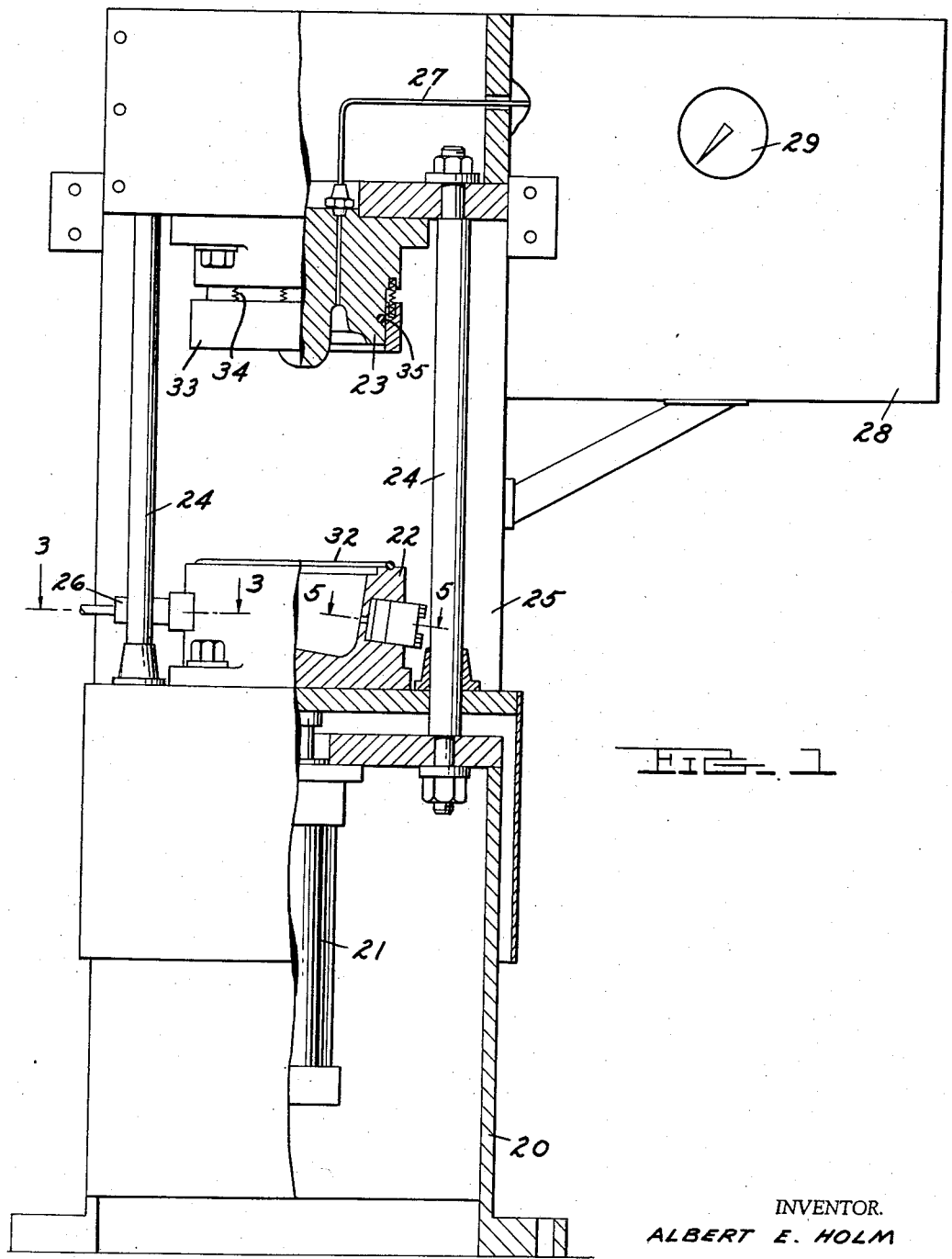
Fig. 1 is a face elevational view, partly in cross-section, of a testing machine embodying the invention showing the part receiving air envelope forming members separated for inserting or removing a part.
Figure 2:
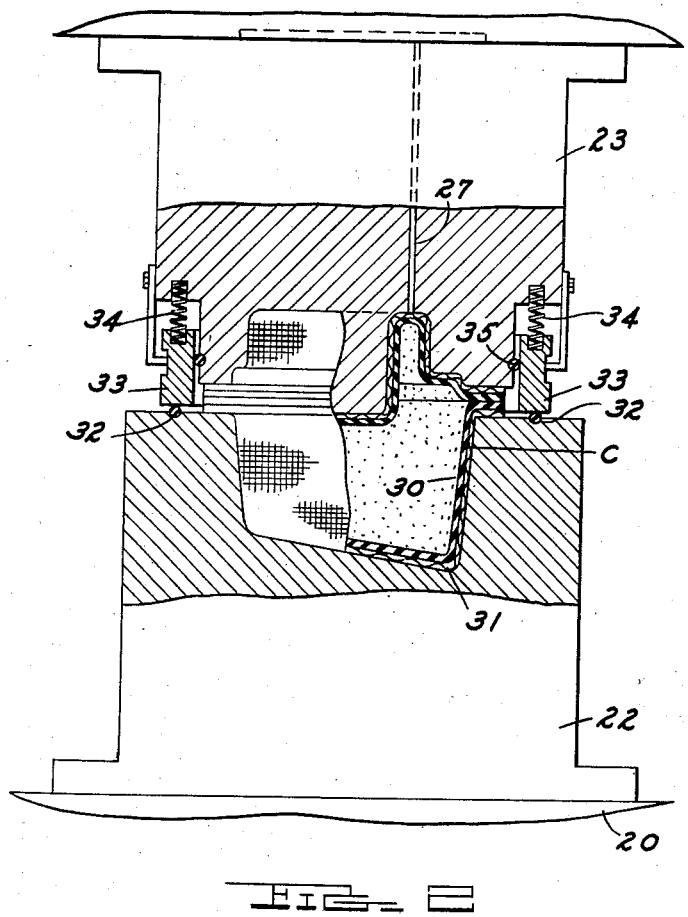
Fig. 2 is an enlarged elevational view, partly in cross-section, of the air envelope forming members sealed closed and a test part enclosed.

It is to be understood that the drawings and following description show a preferred high production, automatic, small volume fluid envelope machine, device, and systems to which the invention is not limited as a test part can be placed in a sealable case and test pressure hose coupling manually connected to the test part interior. The case can then be closed, vented, and sealed and test pressure fed to the part via the hose from an ordinary air compressor and a valve on the case provided for testing the case internal pressure with a gage to determine case pressure at normal indicating no leak or at a raised pressure indicating a leak in the test part. Conversely, the test pressure can be fed to the case and the part interior gaged for a raise in pressure as shown in Fig. 7.

Referring now to the drawings wherein like numerals refer to like and corresponding parts throughout the several views, the exemplary test machine, apparatus, and system comprises a stand 20 having a hydraulic or air ram 21 adapted to raise the lower case portion or chamber base member 22 up to and into sealing engagement with the upper case half portion or chamber head member 23 which is supported by the tension bars 24 and the back beam 25; the test high pressure is applied to the part by the test pressure coupling 26 and the low pressure of the envelope surrounding the test part in the chamber C is communicated via the line 27 to the test mechanism 28 and indicated on the instrument dial 29 as well as on indicator lights and/or other warning devices, such as automatic reject or acceptance transfer means or an audible signal.

More particularly, and preferable for high production, the part 30 to be tested may be of any size, volume displacement, or shape as the part to be tested in high production testing preferably is used to form the cavities in the case members 22 and 23 by first coating the part 30 with a heavy plastic or resin layer and then using the part with the coating as the pattern to form the cavity in members 22 and 23. Upon a part then being inserted in the case or chamber members 22 and 23, the interior walls of the chamber members defining the cavity or chamber lie closely contiguous but spaced from the part being tested so that the air envelope is of very small volume capacity.

A screen liner 31 lies over the cavity walls and it is to be noted that the part in no way can contact the cavity walls to effect a seal or block with the walls at any point particularly at the opening leading to the tube 27, and it can now be seen that when the chamber members 22 and 23 defining the chamber cavity are closed relative to one another in sealing relationship that a small cubic content air envelope area surrounds the part being tested and it has been found that the smaller the envelope volume surrounding the part being tested the more accurate and sensitive reading is detectable and sensible due to the fact that a low volume leak from the part being tested will show up much more readily and rapidly in a small volume vessel and raise the pressure thereof to a much higher proportional degree than would be occasioned by a small volume leak or, for that matter any kind of leak, that would be bleeding into a large volume area or vessel.

After the part 30 has been put into the test chamber C by the operator, or by an automatic transfer mechanism not shown, the chamber member 22 is elevated by the ram 21 and the member 22, seal 32, is brought into forceful engagement with chamber member 23, collar 33, which is spring-loaded by the springs 34 which lie entirely around the circle of the collar 33; upon suitable sealing pressure being exerted by the ram 21, the collar 33 presses against the sealing ring 32 so as to complete a seal between the members. The sealing ring 35 located between the chamber member 23 and the collar 33 permits the collar 33 to move relative to the member 23 so that in the event of a break in the test part, part size variation, or an extremely large leak, the test pressure placed in the chamber then moves the chamber members 22 and 23 apart against the ram 21 without the seal breaking as the springs 34 maintain a gradual type of release under such an abnormal condition which is bound to happen in testing a great number of parts at a high production rate. This, in conjunction with the low envelope volume between closely contiguous walls of the chamber members 22 and 23, prevents any explosive action if a part during test should rupture or have an extremely large leak which would normally dislocate the test machine or blow the seals with explosive force.

After the chamber members 22 and 23 have been sealed around the test part, a cylinder piston rod 36 moves the test pressure air nozzle 37 inwardly towards the test part so as to urge the primary seal 38 against the test part with high pressure under hydraulic force and this action also urges the secondary seal 39 to sealing engagement with the test part radially outwardly of the primary seal 38.

The secondary seal 39 is carried by the sleeve 40 surrounding the nozzle 37 and the spring 41 is adapted to be compressed by the secondary seal contacting the test part 30 so that the secondary seal is urged in spring-pressed relationship to the part to effect a seal; the secondary seal 39 is provided so that in the event a leak occurs at the primary seal 38, any high test pressure escaping therefrom is conducted to the channels 42 surrounding the nozzle 37 in the area of the sleeve 40 and outwardly thereof so that the high test air pressure escaping between the seals 38 and 39 escapes to atmosphere via the channels 42 without possibility of escaping into the envelope E surrounding the part within the chamber members 22 and 23 and it is to be noted also that double seals 43 and 44 are provided surrounding the sleeve 40 so that the envelope E area will not be vented to atmosphere during the test.

Prior to the application of test pressure to the part via the nozzle assembly 26, the gate valve assembly 49 is operated so that the orifice 50 in the gate 51 indexes with the orifice 52 in the chamber member 22 so that any air trapped in bringing the chamber members together or in inserting the nozzle 37 is vented and so that the envelope of air E is established at atmospheric pressure. Upon atmospheric pressure being established in the envelope E, the gate 51 is moved to the position shown so that the chamber member 22, orifice 52, is sealed as by the gate 51 being lapped in sealing relationship with the wall 53 and spring-pressed thereagainst by the springs 54; a ball arrangement is provided wherein the balls 55 allow the plate 51 to move easily relative to the springs 54 under the load pressure against the lapped surfaces. This venting may be delayed, if necessary, until after the application of test pressure to the part to relieve any increase of envelope pressure due to change in displacement in the test part itself.

After the envelope E has been established at atmospheric pressure by the valve arrangement 49 or 108, depending on which is used, and after the test part has been filled with air pressure by the nozzle arrangement 26 to the desired pressure such as 100 lbs. the test is then ready to be run. Line high pressure air supply is fed through the pipe 100 from an air compressor, not shown, through the filter 101 and pipe 102 to the pressure regulator valve 104 which determines pressure at which the test part is to be tested and which pressure is fed toward the test part via line 103 and gage 105, which gives visual indication of the pressure furnished by the regulator valve 104 so as to provide a check on the test pressure which is fed via the pipe 103 to the solenoid operated valve 106 which is controlled by the program timer so as to be open during the test piece filling and test period;; the valve 106 constantly feeds the test pressure via the line 107 to the nozzle arrangement 26 to the test piece 30 contained in the cavity C wherein the test pressure is fed to the interior of the test part 30. As previously explained the chamber C, envelope E, surrounding the test part 30 is evacuated of any pressures built up by closing the cavity members 22 and 23 via the valve 108 which may be a simple solenoid operated valve or the slide valve arrangement 49 previously described.

Valve 140 in line 27, valve 141 in line 142, and valve 143 in line 144 are provided for directly connecting the amplifier transmitter 112 to the low test pressure or for connecting in the booster valve 145 ahead of the amplifier transmitter 112; the booster valve maximum is controlled by the regulator 146 and indicated on the gage 147 on line 148 and valve 149 in line 150 insures isolation of line 27 to amplifier transmitter 112.

After the test part 30 has been filled to the test pressure and the chamber C evacuated to the low reference pressure such as atmospheric pressure, the solenoid valve 109 in the line 27 leading from the envelope E is opened with valve 140 open and valves 141, 143, and 149 closed and this communicates the envelope E low pressure via the surge restrictor 110 in the line 111 to the differential pressure amplifier transmitter 112 which also has been previously established to operate at atmospheric pressure under normal conditions via the line 130 and atmospheric pressure reference vent 131; the amplifier transmitter 112 furnishes the amplified signal via the pipe 113 to the gage 29 so that a visual indication can be obtained for any pressure rise in the envelope E signifying that the part 30 is leaking under the test pressure, and the line 113 also feeds the amplified pressure to the air relay valve diaphragm and spring head 114 so as to operate the servo-valve 115 to an open or closed condition so as to activate the pressure sensitive pneumatic-electric switch 116 which is either normally open or normally closed as desired in the system. The switch 116 can be integrated so as to have a green light normally lighted under a no-leak condition with the envelope pressure at atmospheric conditions and so that any change in the envelope E to a pressure higher than normal will cause the relay valve 115 to add pressure to the switch 116 to turn out the green light and turn on a red light thereby signalling that the pressure in the envelope E has risen indicating a leak in the part.

When it is desired to amplify the low pressure change ahead of the amplifier transmitter 112, the valve 140 is closed and the valves 141, 143, and 149 opened so that line pressure is fed to the booster valve 145 via lines 144 and 148 through regulator 146 which is adapted to reduce the line pressure to an amount insufficient to damage the amplifier transmitter 112; low pressure side communicates with the booster servo-valve 145 via line 142 and an increase in low pressure operates valve 147 to send a booster sensing to the amplifier 102 via lines 150 and 127.

Line pressure is fed to the valve 115 via the pipe 117 leading from the pipe 102 through the regulator 118 and gage 119 via the pipe 120 to the servo-air relay valve 115. Necessary pressure air is also fed to the differential pressure transmitter amplifier 112 from the line 117 via the line 121, pressure regulator 122, gage 123, and line 124 to the booster pressure pilot valve 125 which is servo-operated by the pressure in line 126 leading from the differential amplifier transmitter 112 so that when the differential amplifier transmitter 112 changes from a normal condition to that indicating a rise of pressure in the envelope E, the booster pilot valve 125 opens furnishing an increased pressure through the pipe 127 to the line 113 and gage 29 and diaphragm and spring arrangement of the air relay valve 115 so as to give a boosted sensing to the pressure operated pneumatic electric switch 116. Overload relief valve 132 is disposed between pressure line 111 and the vent line 130 via lines 133 and 134 ahead of surge restrictor 110 so that any excessive pressure in line 111 is shunted to atmosphere to protect the sensitive amplifier transmitter 112 such as if a test part burst under test.

When it is desired to pressurize the envelope E instead of the part interior, Fig. 7, the high pressure test line 107 is fed directly to the envelope E while the low pressure line 27 is connected to the part interior via the coupling 26 so that the rise in part interior pressure is measured and the exterior of the part submitted to the high test pressure. While the operation of this modification is not explicitly set forth, it will be understood to be the same as the operation of the device described in conjunction with the other figures.

In the operation of the inventive device, the cavity members 22 and 23 are separated and the test part 30 is placed in the cavity member 22 and the program timer, not shown, as is well understood in the timer art initiates the automatic cycle which initially furnishes power to the cylinder 21 so as to raise the chamber member 22 into sealing contact with the cavity member 23 and also feeds pressure to the hydraulic cylinder connected to the piston connecting rod 36 so as to force the nozzle arrangement 26 into sealing relationship with the part 30 contained within the chamber C and the valve 106 is then opened feeding regulated test pressure to the interior of the part 30 and this pressure is preferably continuously fed to the part during the test period. The valve arrangement 108 is then operated to open the envelope E to atmospheric pressures so as to relieve any additional pressure established in the envelope E by the closing of the chamber members into compressed sealing relationship and the expansion of the part due to being pressurized; the valve 108 is then closed.

Upon the closing of the atmospheric venting valve 108 the test period begins and the pressure of the envelope E is then communicated through the valve 109 which is then opened so as to communicate pressure to the differential pressure amplifier transmitter 112; if a rise in pressure is indicated by the gage 29 and lights, bells, or other signal attached to the pressure sensitive switch 116 indicates a rise in pressure in the envelope E then the part is established as a leaker.

The duration of the test phase is controlled by the program timer which may be an Eagle Signal "Multifex" multiple circuit reset timer which has been found suitable; any suitable timer can be used. The program timer can be integrated with the various circuits as is well understood in the timer art to operate in the desired sequence and for desired periods all the valves, meters, etc. including the rams 21 and 36 for advancing, holding, and retracting the chamber member 22 and nozzle 37 respectively as well as transfer mechanism in loading the test part and accepting or rejecting the test part.

By designing and constructing the chamber enclosure so that the volume of the enveloping air around the part being tested is at an absolute minimum, then the pressure change due to a leak from the part will be extremely proportionately large when compared to the pressure change that would take place within a large air volume subjected to the same leak volume. Where the envelope is one-quarter the capacity of the part tested, the sensitivity and ratio is four times as sensitive on volume alone.

In order to implement this principle, a cavity must be made to nest and closely receive the part being tested and include means of sealing any parts or openings in the part so that when a fluid is supplied through one or more parts the test piece is pressurized. If the test piece is of such a nature that it will deform due to the pressure introduced then a means of venting the envelope must be incorporated to remove the pressure due to the displacement change of the part being tested. The "venting" or the removal of the pressure due to expansion must be accomplished prior to the test for leakage phase of the operation.

The inventive testing system and means with the features described constitutes a compact, durable, fool-proof, accurate, reliable, and high speed production system and apparatus for quickly and inexpensively testing parts for leaks.

The system and apparatus is not limited to high test pressures, fast action, or air as a test fluid as other fluids can also be used such as liquid or gas.

Although but a single embodiment of the invention has been shown and described in detail together with a described simplified apparatus and system, it is obvious that many changes may be made in the size, shape, detail, and arrangement of the various elements of the invention within the scope of the appended claims.

I claim:

1. A leak testing apparatus integrated to determine leaks in test parts by detecting a rise in the low pressure side preferably at atmospheric pressure due to leaking from the high pressure side comprising a stand, tension-support beams extending from said stand, a head on said beams spaced from said stand, a mating case member on said stand, a mating case member on said head; said case members having inside surfaces defining a cavity; a hydraulic ram connected to one said case member for advancing said case member to close into sealing relationship with said other case member and for retracting said case member for respectively enclosing and extracting a test part; a porous channeled member such as a screen liner disposed over said case member inside surfaces for contacting and holding a test part in spaced relationship to said case member inside surfaces; said closed case members when containing a test part completely enveloping and surrounding a test part in universal spaced relationship via said porous member with a sealed fluid envelope; means for establishing said envelope at atmospheric pressure on the low pressure side such as by venting temporarily; means penetrating one said case member for sealably contacting a test part for subjecting the other said test part to a relatively high test pressure on the high pressure side so that a leak in the test part permits fluid pressure communication from the high pressure side to the low pressure side via the test orifice of the test part wall; and means for determining the pressure on the low pressure side to detect a leak in a part by indicating a rise in pressure on the low pressure side.

2. In a device as set forth in claim 1, a nozzle constituting a portion of said means penetrating one said case member for sealably contacting a test part in said case, and a hydraulic ram for advancing and retracting said nozzle.

3. A leak testing apparatus particularly suitable for testing parts equipped with a test orifice comprising a two-piece case openable for receiving or emitting a test part and closable for sealing a test part therein; said case members having solid inside walls defining a cavity; said solid inside walls having a porous channeled surface for contacting and holding a test part in spaced relationship to said case member's solid inside walls; said case being adapted to enclose a test part in relationship within said case via said channeled surface so that a test part disposed therein is completely surrounded by spaced case walls defining a fluid envelope around a test part; a nozzle extending through said case for sealably contacting a closed part test orifice, means on said nozzle for supplying fluid pressure to said part interior, and means for measuring the pressure of the fluid envelope between said case and a part to detect a leak in a part by indicating a rise in pressure.

4. In a device as set forth in claim 3, said case pieces being spaced apart under normal sealing conditions; a collar sealably surrounding one said case piece and adapted to seal against the other said case piece, and springs on said one case piece urging said collar into sealing relationship with said other case piece.

5. A leak testing apparatus comprising a sealable case-like split member for completely enclosing a part to be tested for leaks, said member's inside walls being universally spaced from a part to be tested so that a sealed fluid envelope surrounds and envelops a contained test part; means for pressurizing said test part interior, and means for measuring the pressure of said envelope to detect a leak by indicating a rise in pressure, said member inside walls having surface channelling therein so as to communicate fluid past a part that may otherwise touch a wall area thereby obviating blocking of a leak and preventing transfer of increased pressure.

6. A leak testing apparatus comprising a sealable case-like split member for completely enclosing a part to be tested for leaks, said member's inside walls being universally spaced from a part to be tested so that a sealed fluid envelope surrounds and envelops a contained test part; means for pressurizing said test part interior, and means for measuring the pressure of said envelope to detect a leak by indicating a rise in pressure, and a screen liner disposed on said member inside walls to prevent a test part from contacting said walls and to provide fluid communication past a test part in wall contact.

7. A leak testing apparatus comprising a sealable case-like split member for completely enclosing a part to be tested for leaks; means spacing said member's inside walls from a part to be tested so that a sealed fluid envelope surrounds and envelops a contained test part; means for pressurizing said test part interior, and means for measuring the pressure of said envelope to detect a leak by indicating a rise in pressure, said case member being split into at least two separable and closable portions for easily inserting and extracting test parts; one said case member having a spring-pressed collar for sealably contacting said other case member so that said case members may move relative to one another with said spring-pressed collar maintaining a seal between said members.

8. A leak testing apparatus comprising a sealable case-like split member for completely enclosing a part to be tested for leaks, means spacing said member's inside walls from a part to be tested so that a sealed fluid envelope surrounds and envelops a contained test part; means for pressurizing said test part interior, and means for measuring the pressure of said envelope to detect a leak by indicating a rise in pressure, a nozzle disposed in said case adapted to sealably contact a test part in said case for communicating pressure to and from a test part; said nozzle having test part contacting inner and outer seals concentrically disposed; said nozzle having at least one bleeder channel leading from a test part area between said inner and outer seals to atmosphere so that a leak past either seal is bled off.

9. A leak testing apparatus comprising a sealable case-like split member for completely enclosing a part to be tested for leaks; means spacing said member's inside walls from a part to be tested so that a sealed fluid envelope surrounds and envelops a contained test part; means for pressurizing said envelope, means for measuring the internal pressure of said test part to detect a leak by indicating a rise in pressure; said member inside walls having surface channelling therein so as to communicate fluid past a part that may otherwise touch a wall area thereby obviating blocking of a leak and preventing transfer of increased pressure.

10. A leak testing apparatus comprising a sealable case-like split member for completely enclosing a part to be tested for leaks; means spacing said member's inside walls from a part to be tested so that a sealed fluid envelope surrounds and envelops a contained test part; means for pressurizing said envelope, means for measuring the internal pressure of said test part to detect a leak by indicating a rise in pressure; and a screen liner disposed on said member inside walls to prevent a test part from contacting said walls and to provide fluid communication past a test part in wall contact.

11. A leak testing apparatus comprising a sealable case-like split member for completely enclosing a part to be tested for leaks; means spacing said member's inside walls from a part to be tested so that a sealed fluid envelope surrounds and envelops a contained test part; means for pressurizing said envelope, means for measuring the internal pressure of said test part to detect a leak by indicating a rise in pressure; said case member being split into at least two separable and closable portions for easily inserting and extracting test parts; one said case member having a spring-pressed collar for sealably contacting said other case member so that said case members may move relative to one another with said spring-pressed collar maintaining a seal between said members.

12. A leak testing apparatus comprising a sealable case-like split member for completely enclosing a part to be tested for leaks; means spacing said member's inside walls from a part to be tested so that a sealed fluid envelope surrounds and envelops a contained test part; means for pressurizing said envelope, means for measuring the internal pressure of said test part to detect a leak by indicating a rise in pressure; a nozzle disposed in said case adapted to sealably contact a test part in said case for communicating pressure to and from a test part; said nozzle having test part contacting inner and outer seals concentrically disposed; said nozzle having at least one bleeder channel leading from a test part area between said inner and outer seals to atmosphere so that a leak past either seal is bled off.

13. A leak testing chamber member particularly suitable for high pressure testing so that parts can be tested quickly and especially the presence of minute leaks quickly determined comprising a two-part case-like member having inside walls adapted to be spaced from a part to be tested so that a sealed fluid envelope surrounds and envelops a test part contained therein; means on said case member inside walls for holding a test part in spaced relationship thereto; said case member parts having mutually adjacent surfaces in the closed position; one said case member having a spring pressed floating collar adapted to press against the other said case member, a seal disposed between said collar and said other case member, and a seal disposed between said collar and said case member upon which said collar is mounted;

said case members being capable of moving outwardly and canting under the contained high pressure with said spring pressed floating collar maintaining a seal between both said members.

14. In a device as set forth in claim 13, said case member adjacent surfaces being normally spaced apart in closed condition.

15. A leak testing apparatus combination including separate test chamber case sealing means, separate part test orifice sealing means comprising a hollow split case member having interior walls defining a test chamber when closed; said case member portions being separable for receiving a test part; power means for closing said case portions for enveloping a test part; case portion sealing means disposed between said case portions activated by the force closing said case portions; means on said test chamber case interior walls for holding a test part in universal spaced non-sealing relationship therewith so as to leave a part test orifice open, and part test orifice sealing means disposed through one said case portion for contacting and sealing a test part test orifice so as to seal off a test part interior within said test chamber case interior.

16. In a device as set forth in claim 15, said part test orifice sealing means comprising a sleeve sealably slidably disposed relative to said case portion side wall having an inserted end equipped with a seal for sealing said part test orifice, and means for moving said sleeve end seal against a part test orifice.

17. In a device as set forth in claim 16, an exterior end on said sleeve, an outer sleeve on said sleeve in the area of said case portion side wall, a seal between said outer sleeve and said case portion side wall, a seal at the end of said outer sleeve for contacting a test part and sealing thereagainst radially outwardly of said sleeve end seal, a bleeder channel between said sleeve and said outer sleeve to atmosphere, and a spring disposed between said sleeve outer end and said outer sleeve urging said outer sleeve seal against a test part; said sleeve and end seal, said outer sleeve and end seal, and said bleeder channel providing a double seal area to prevent communication between a part interior and said test chamber by diverting leaks in seals at a test part from either the chamber or the part to atmosphere via said bleeder channel communicating to the area between said seals.

References Cited in the file of this patent
UNITED STATES PATENTS

| | | |
|---|---|---|
| 1,815,523 | O'Neil | July 21, 1931 |
| 1,861,542 | McDonald et al. | June 7, 1932 |
| 2,020,535 | Cameron | Nov. 12, 1935 |
| 2,051,758 | Trombly | Aug. 18, 1936 |
| 2,749,743 | Foster | June 12, 1956 |